US011799070B2

(12) United States Patent
Choi et al.

(10) Patent No.: US 11,799,070 B2
(45) Date of Patent: Oct. 24, 2023

(54) NEGATIVE ELECTRODE ACTIVE MATERIAL FOR LITHIUM SECONDARY BATTERY, METHOD OF PREPARING THE SAME, AND NEGATIVE ELECTRODE FOR LITHIUM SECONDARY BATTERY AND LITHIUM SECONDARY BATTERY INCLUDING THE SAME

(71) Applicant: LG CHEM, LTD., Seoul (KR)

(72) Inventors: Hee Won Choi, Daejeon (KR); Jae Wook Lee, Daejeon (KR); Eun Kyung Kim, Daejeon (KR); Seung Youn Choi, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 654 days.

(21) Appl. No.: 16/981,925

(22) PCT Filed: Apr. 2, 2019

(86) PCT No.: PCT/KR2019/003904
§ 371 (c)(1),
(2) Date: Sep. 17, 2020

(87) PCT Pub. No.: WO2019/194554
PCT Pub. Date: Oct. 10, 2019

(65) Prior Publication Data
US 2021/0126248 A1 Apr. 29, 2021

(30) Foreign Application Priority Data

Apr. 4, 2018 (KR) ........................ 10-2018-0039022

(51) Int. Cl.
| H01M 4/36 | (2006.01) |
| C01B 32/21 | (2017.01) |
| H01M 4/133 | (2010.01) |
| H01M 4/587 | (2010.01) |
| H01M 10/0525 | (2010.01) |
| H01M 4/02 | (2006.01) |

(52) U.S. Cl.
CPC ............ H01M 4/364 (2013.01); *C01B 32/21* (2017.08); *H01M 4/133* (2013.01); *H01M 4/366* (2013.01); *H01M 4/587* (2013.01); *H01M 10/0525* (2013.01); *C01P 2002/88* (2013.01); *C01P 2004/61* (2013.01); *C01P 2004/84* (2013.01); *C01P 2006/40* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 10,439,221 | B2 | 10/2019 | Choi et al. |
| 2002/0008551 | A1 | 1/2002 | Ryu et al. |
| 2011/0262812 | A1 | 10/2011 | Han et al. |
| 2015/0104711 | A1 | 4/2015 | Waki et al. |
| 2016/0372751 | A1 | 12/2016 | Lee et al. |
| 2017/0110730 | A1 | 4/2017 | Tanaka |
| 2018/0190985 | A1 | 7/2018 | Choi et al. |
| 2019/0088947 | A1 | 3/2019 | Piao et al. |
| 2020/0127289 | A1 | 4/2020 | Kim et al. |

FOREIGN PATENT DOCUMENTS

| CN | 107851795 A | | 3/2018 |
| EP | 3297073 A1 | | 3/2018 |
| JP | 2008104707 A | * | 5/2008 |
| JP | 2009064752 A | * | 3/2009 |
| JP | 4403327 B2 | | 1/2010 |
| JP | 2010-73618 A | | 4/2010 |
| JP | 2014-7148 A | | 1/2014 |
| JP | 2014-229517 A | | 12/2014 |
| JP | 2016-177876 A | | 10/2016 |
| KR | 10-2000-0032795 A | | 6/2000 |
| KR | 10-1031920 B1 | | 5/2011 |
| KR | 10-2014-0006967 A | | 1/2014 |
| KR | 10-2014-0099988 A | | 8/2014 |
| KR | 10-1563901 B1 | | 10/2015 |
| KR | 10-2015-0134945 A | | 12/2015 |
| KR | 10-2017-0075661 A | | 7/2017 |
| KR | 10-2017-0093754 A | | 8/2017 |
| KR | 10-1790392 B1 | | 10/2017 |
| KR | 10-2018-0029919 A | | 3/2018 |

OTHER PUBLICATIONS

Abstract of JP-2008104707-A. (Year: 2008).*
Abstract of JP-2009064752-A. (Year: 2009).*
"Application Of Electron Microscopy In Electric Carbon", Electric Carbon Research Insitute Of Harbin, May 1978, 5 pages.
European Patent Office Search Report dated Mar. 26, 2021 in corresponding EP Application No. 19781514.5.
International Search Report (PCT/ISA/210) issued in PCT/KR2019/003904, dated Jul. 18, 2019.

* cited by examiner

*Primary Examiner* — Gregg Cantelmo
(74) *Attorney, Agent, or Firm* — Birch, Stewart, Kolasch & Birch, LLP

(57) ABSTRACT

A negative electrode active material for a lithium secondary battery, including: first negative electrode active material particles including first artificial graphite particles and a carbon coating layer on a surface of the first artificial graphite particles, wherein the carbon coating layer comprises hard carbon; and second negative electrode active material particles including second artificial graphite particles, wherein a difference between an average particle diameter $D_{50}$ of the first negative electrode active material particles and an average particle diameter $D_{50}$ of the second negative electrode active material particles is 5 μm or less, and a temperature at an exothermic peak in differential thermogravimetric analysis of the carbon coating layer is in a range of 580° C. to 690° C.

11 Claims, No Drawings

NEGATIVE ELECTRODE ACTIVE MATERIAL FOR LITHIUM SECONDARY BATTERY, METHOD OF PREPARING THE SAME, AND NEGATIVE ELECTRODE FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Patent Application No. 10-2018-0039022 filed on Apr. 4, 2018, the entire contents of which are incorporated herein by reference.

TECHNICAL FIELD

The present invention relates to a negative electrode active material for a lithium secondary battery, a method of preparing the same, and a negative electrode for a lithium secondary battery and a lithium secondary battery including the same.

BACKGROUND ART

As the price of energy sources increases due to the depletion of fossil fuels and the interest on environmental pollution increases, an environmentally friendly alternative energy source has become an indispensable factor for future life.

In particular, as technology development and demand for mobile devices increase, the demand for secondary batteries as an environmentally friendly alternative energy source is rapidly increasing.

In the existing secondary battery, a lithium metal has been used as a negative electrode. However, as a risk of short circuit of the battery and the resulting explosion due to the formation of a dendrite becomes a problem, the use of carbon-based active materials which allow reversible intercalation and deintercalation of lithium ions and maintain structural and electrical properties is emerging.

Various types of carbon-based materials such as artificial graphite, natural graphite, hard carbon and the like have been applied as the carbon-based active material. Among these, a graphite-based active material capable of ensuring lifetime characteristics of a lithium secondary battery with excellent reversibility has been most widely used. Since the graphite-based active material has a low discharge voltage of −0.2 V compared with lithium, the battery formed using the graphite-based active material can exhibit a high discharge voltage of 3.6 V, thereby providing many advantages in terms of energy density of the lithium battery.

Meanwhile, a rolling process is performed in an electrode process during production of a lithium secondary battery in order to produce a lithium secondary battery having a high capacity and high electrode density. In this case, when the graphite-based active material is hard, rolling is difficult, and it may be difficult to obtain a desired density. On the other hand, when the graphite-based active material is soft, it is easy to obtain a high-density electrode due to easy rolling in the production of electrodes, but it completely blocks the voids present between the particles and adversely affects the impregnability of the electrolytic solution.

Japanese Patent Publication No. 4403327 discloses a graphite powder for a negative electrode of a lithium ion secondary battery, but does not propose an alternative to the above-described problems.

RELATED ART

Patent Document

Japanese Patent Publication No. 4403327

DISCLOSURE

Technical Problem

One object of the present invention is to provide a negative electrode active material for a lithium secondary battery with improved rapid charging characteristics and high-temperature storage performance.

Another object of the present invention is to provide a method of preparing the above-described negative electrode active material for a lithium secondary battery.

Further, still another object of the present invention is to provide a negative electrode for a lithium secondary battery and lithium secondary battery including the above-described negative electrode active material for a lithium secondary battery.

Technical Solution

The present invention provides a negative electrode active material for a lithium secondary battery, including: first negative electrode active material particles including first artificial graphite particles and a carbon coating layer on a surface of the first artificial graphite particles, wherein the carbon coating layer comprises hard carbon; and second negative electrode active material particles including second artificial graphite particles, wherein a difference between an average particle diameter $D_{50}$ of the first negative electrode active material particles and an average particle diameter $D_{50}$ of the second negative electrode active material particles is 5 μm or less, and a temperature at an exothermic peak in differential thermogravimetric analysis of the carbon coating layer is in a range of 580° C. to 690° C.

Further, the present invention provides a method of preparing a negative electrode active material for a lithium secondary battery, including steps of: preparing first negative electrode active material particles and second negative electrode active material particles; and mixing the first negative electrode active material particles and the second negative electrode active material particles together, wherein the step of preparing first negative electrode active material particles includes: step a), preparing first artificial graphite particles; and step b), mixing the first artificial graphite particles and a carbon coating layer-forming material including a carbon-based material formed by a first heat treatment and a polymer for controlling crystallinity, and performing a second heat treatment on the mixture of the first artificial graphite particles and the carbon coating layer-forming material to form a carbon coating layer including hard carbon on a surface of the first artificial graphite particles, a difference between an average particle diameter $D_{50}$ of the first negative electrode active material particles and an average particle diameter $D_{50}$ of the second negative electrode active material particles is 5 μm or less, and a temperature at an exothermic peak in differential thermogravimetric analysis of the carbon coating layer is in a range of 580° C. to 690° C.

Further, the present invention provides a negative electrode for a lithium secondary battery including the above-described negative electrode active material for a lithium secondary battery.

Further, the present invention provides a lithium secondary battery including the negative electrode for a lithium secondary battery.

Advantageous Effects

The negative electrode active material for a lithium secondary battery of the present invention includes first negative electrode active material particles which include a carbon coating layer including hard carbon to have high hardness and low charge transfer resistance, and second negative electrode active material particles having low hardness. Accordingly, when the first and second negative electrode active material particles are blended, the second negative electrode active material particles are disposed around the first negative electrode active material particles, so that there is less damage to the active material during rolling, and the change in specific surface area of the active material layer is small, thereby improving high temperature-storage performance.

Further, the negative electrode active material for a lithium secondary battery of the present invention includes first negative electrode active material particles including a carbon coating layer of which the temperature at an exothermic peak in differential thermogravimetric analysis is in the range of 580 to 690° C. The carbon coating layer satisfying the above-described range can improve the structural stability of the particles by improving the hardness of the first negative electrode active material particles to a suitable level, and also facilitates the entry and exit of lithium ions into the active material to enhance rapid charging characteristics to a superior level.

Further, in the negative electrode active material for a lithium secondary battery of the present invention, a difference in the average particle diameter $D_{50}$ of the first and second negative electrode active material particles is 5 μm or less, and thus it is possible to prevent an increase in the diffusion resistance of lithium ions which may be caused by using large-sized and small-sized particles having a difference in average particle diameter $D_{50}$ of more than 5 μm, thereby improving the rapid charging performance and capacity efficiency.

MODES OF THE INVENTION

Terminology used in the specification and claims should not be construed as limited to conventional or literal meanings, and should be construed as having meanings and concepts corresponding to the technical idea of the present invention based on the principle that the inventor can suitably define the concept of a term to explain his own invention in the most preferable way.

The terms used in the present specification are only used to describe specific various embodiments, and are not intended to limit the present invention. It is to be understood that the singular forms include plural referents unless the context clearly dictates otherwise.

In the present specification, the expressions such as "include", "comprise" or "have" should be construed as specifying the presence of a certain characteristic, number, operation, constituent element, component or a combination thereof, but should not be construed as excluding the possibility of the presence or addition of one or more other characteristics, numbers, operations, constituent elements, components or combinations thereof.

In the present specification, an average particle diameter $D_{50}$ may be defined as a particle diameter corresponding to 50% of the volume accumulation in a particle diameter distribution curve. The average particle diameter $D_{50}$, for example, may be measured by using a laser diffraction method. The laser diffraction method may generally measure a particle diameter ranging from a submicron level to several mm, and may obtain highly repeatable and high resolution results.

Hereinafter, the present invention will be described in detail.

Specifically, the present invention provides a negative electrode active material for a lithium secondary battery in which two different types of negative electrode active material particles are mixed to improve the high-temperature storage performance and rapid charging characteristics of the electrode, and a negative electrode for a lithium secondary battery including the same.

Further, the present invention provides a lithium secondary battery including the negative electrode for a lithium secondary battery.

Negative Electrode Active Material for Lithium Secondary Battery

The present invention relates to a negative electrode active material for a lithium secondary battery, and specifically, the negative electrode active material for a lithium secondary battery includes (A) first negative electrode active material particles including first artificial graphite particles and a carbon coating layer formed on the first artificial graphite particles and including hard carbon; and (B) second negative electrode active material particles including second artificial graphite particles. The difference between the average particle diameter $D_{50}$ of the first negative electrode active material particles and an average particle diameter $D_{50}$ of the second negative electrode active material particles is 5 μm or less, and a temperature at an exothermic peak in differential thermogravimetric analysis of the carbon coating layer is in a range of 580 to 690° C.

(A) First Negative Electrode Active Material Particles

The first negative electrode active material particles include first artificial graphite particles and a carbon coating layer formed on the first artificial graphite particles and including hard carbon.

The first artificial graphite particles may serve to improve the rapid charging characteristics of the battery.

The first artificial graphite particles may be secondary artificial graphite particles formed by aggregating one or more primary artificial graphite particles. Specifically, the aggregation of the primary artificial graphite particles may mean that a plurality of primary artificial graphite particles are bonded to or assembled with each other, and more specifically, a plurality of primary artificial graphite particles are mixed with an aggregating binder to be bonded to or assembled with each other.

The aggregating binder may be one or a mixture of two or more selected from the group consisting of a vinylidene fluoride-hexafluoropropylene copolymer, polyvinylidene fluoride, polyacrylonitrile, polymethyl methacrylate, polyvinyl alcohol, carboxymethyl cellulose, starch, hydroxypropyl cellulose, regenerated cellulose, polyvinylpyrrolidone, polytetrafluoroethylene, polyethylene, polypropylene, polyacrylic acid, an ethylene propylene diene monomer (EPDM), a sulfonated-EPDM, styrene butadiene rubber and fluorocarbon rubber, and preferably, a vinylidene fluoride-hexafluoropropylene copolymer, polyvinylidene fluoride, or a mixture thereof.

Here, the secondary artificial graphite particles may be formed by introducing the primary artificial graphite particles into a mixer and then stirring and aggregating the particles with an aggregating binder. Alternatively, the secondary artificial graphite particles may be formed by mixing and stirring the primary artificial graphite particles with a carbon coating layer-forming material and a carbon coating layer-forming binder to be described below to aggregate the primary artificial graphite particles, and forming a carbon coating layer on the surface of the secondary artificial graphite particles. Here, the carbon coating layer-forming binder may simultaneously perform a function as an aggregating binder for aggregating the primary artificial graphite particles and a function for improving the adhesion between the secondary artificial graphite particles and the carbon coating layer.

When the first artificial graphite particle is a secondary artificial graphite particle including an aggregation of primary artificial graphite particles, a first void may be present inside the secondary artificial graphite particles.

The first void may be an empty space between the primary artificial graphite particles, may be amorphous, and may number two or more. The first void may have various forms, for example, may extend to the surface of the secondary artificial graphite particle to be exposed to the outside, or may be present only in the interior of the secondary artificial graphite particle. The contact area between the negative electrode active material and the lithium ion may be further widened by the first void, and thus the capacity characteristics and cycle lifetime characteristics may be further improved.

The carbon coating layer is formed on the first artificial graphite particles and includes hard carbon.

The carbon coating layer serves to facilitate the entry and exit of lithium ions into the first negative electrode active material particles and lower the diffusion resistance of lithium ions, thereby further improving the rapid charging performance of the battery. Further, the carbon coating layer may include hard carbon to improve the hardness of active material particles, thereby improving the structural stability of the active material. Further, when the first artificial graphite particles are in the form of secondary artificial graphite particles, the structure of secondary particles may collapse during charging and discharging, but since the form of secondary artificial graphite particles is smoothly maintained by the carbon coating layer, the structural stability and rapid charging performance may be improved.

The carbon coating layer includes hard carbon, and a temperature at an exothermic peak in differential thermogravimetric analysis of the carbon coating layer may be in the range of 580 to 690° C., and preferably 620 to 670° C. The temperature at an exothermic peak in differential thermogravimetric analysis of the carbon coating layer may refer to a temperature at an exothermic peak in differential thermogravimetric analysis of hard carbon contained in the carbon coating layer.

Thermogravimetry is an analytical method which measures changes in weight occurring with physical and chemical changes while heating a sample at a constant rate, and the differential thermogravimetric analysis is an analytical method for analyzing the change in weight loss with respect to a change in temperature of a thermogravimetric analysis curve, that is, plotting a differential value of a curve to show a differential thermogravimetric analysis curve. An exothermic peak in the differential thermogravimetric analysis may be a point at which the weight loss is the maximum in the thermogravimetric analysis curve. For example, in the differential thermal analysis curve obtained by plotting the differential value of the thermogravimetric analysis curve of the first negative electrode active material particle, the exothermic peak in the differential coating thermogravimetric analysis of the carbon coating layer may be a maximum exothermic peak point of the corresponding section of the carbon coating layer. The differential thermal analysis curve of the first negative electrode active material particles may have two exothermic peak points corresponding to the carbon coating layer and the first artificial graphite particles. The exothermic peak temperature in the differential thermal analysis of the carbon coating layer may be relatively low among the two exothermic peak points and the temperature of the exothermic peak in the differential thermal analysis of the first artificial graphite particles may be relatively high among the two exothermic peak points. Specifically, in the first negative electrode active material particle, the exothermic peak in the differential thermal analysis of the carbon coating layer may be the maximum exothermic peak appearing in a temperature range of 580 to 690° C., and the exothermic peak in the differential thermal analysis of the first artificial graphite particles may be the maximum exothermic peak appearing at a temperature higher than the exothermic peak of the carbon coating layer, specifically, in a temperature range of more than 690° C.

When a temperature at an exothermic peak in differential thermogravimetric analysis of the carbon coating layer is less than 580° C., hardness and crystallinity of a desired level may not be obtained, and the structural stability of the active material may be deteriorated, thereby deteriorating the high-temperature storage characteristics and lifetime characteristics. When a temperature at an exothermic peak in differential thermogravimetric analysis of the carbon coating layer is more than 690° C., as crystallinity of the carbon coating layer becomes excessively high, since the diffusion resistance of lithium ions is increased, the rapid charging characteristics of the battery may be deteriorated.

The carbon coating layer may be formed on the first artificial graphite particles by coating after mixing the first artificial graphite particles and the carbon coating layer-forming material and then performing heat treatment on the mixture. The carbon coating layer-forming material may be subject to heat treatment to form hard carbon. The hard carbon may be a sintered material of the carbon coating layer-forming material.

When the first artificial graphite particles are in the form of secondary artificial graphite particles, the carbon coating layer may be formed on the secondary artificial graphite particles by mixing the primary artificial graphite particles and the carbon coating layer-forming material and performing heat treatment on the mixture in the process of aggregating the primary artificial graphite particles. Here, although the hard carbon, which is a sintered material of the carbon coating layer-forming material, is formed on the secondary artificial graphite particles to form a carbon coating layer, it may be applied on at least a part of the primary artificial graphite particles or may be positioned in the space between the aggregated primary artificial graphite particles.

The carbon coating layer-forming material may include a carbon-based material and a polymer for controlling crystallinity.

The average particle diameter $D_{50}$ of the first negative electrode active material particles is in the range of 15 to 27 µm, preferably 17 to 25 µm, and more preferably in the range of 19 to 22 µm in terms of having excellent rapid charging characteristics and high-temperature storage performance, and securing capacity.

The first negative electrode active material particles may be spherical, and in this case, the first negative electrode active material particles are preferable in terms of improvement in rolling performance, and improvement in capacity characteristics and rapid charging characteristics due to an increase in specific surface area. Such a spherical shape may be understood to include not only a complete sphere shape but also a substantial sphere shape. Here, the substantially spherical shape may be understood as a concept that the particle includes a substantially spherical or somewhat distorted spherical shape.

(B) Second Negative Electrode Active Material Particles

The second negative electrode active material particles include second artificial graphite particles.

Specifically, unlike the first negative electrode active material, the second negative electrode active material particles do not include a carbon coating layer containing the hard carbon, and thus the second negative electrode active material particles are relatively soft compared to the first negative electrode active material particles. Accordingly, when these particles are blended, the change of specific surface area of the electrode during rolling may be minimized and the high temperature-storage performance may be improved.

The size, shape, preparation method and the like of the second artificial graphite particles may be the same as those described in the first artificial graphite particles, except for the description about the carbon coating layer.

The second artificial graphite particles may be secondary artificial graphite particles formed by aggregating one or more primary artificial graphite particles. Specifically, the aggregation of the primary artificial graphite particles may mean that a plurality of primary artificial graphite particles are bonded to or assembled with each other, and more specifically, a plurality of primary artificial graphite particles are mixed with an aggregating binder to be bonded to or assembled with each other.

The second negative electrode active material particles may be spherical, and in this case, it is preferable in terms of improvement of rolling performance and high-temperature storage characteristics.

The average particle diameter $D_{50}$ of the second negative electrode active material particles may be in the range of 15 to 27 µm, preferably 17 to 25 µm, and more preferably 19 to 22 µm. The above-described range is preferable in terms of securement of the battery capacity and improvement of high temperature-storage characteristics.

In the negative electrode active material for a lithium secondary battery according to the present invention, a difference in the average particle diameter $D_{50}$ of the first negative electrode active material particles and the second negative electrode active material particles is 5 µm or less, preferably, 4 µm or less, and more preferably 2 µm or less. When large-sized particles and small-sized particles having a difference in average particle diameter $D_{50}$ of more than 5 µm are blended in a bi-modal structure, micropores of the inside are increased due to small-sized particles, and the migration path of lithium becomes long at the time of charging, so that the diffusion resistance of lithium ions is increased and the battery capacity efficiency may decrease. However, since the first and second negative electrode active material particles have a difference in average particle diameter $D_{50}$ of 5 µm or less, and each have an average particle size $D_{50}$ similar to each other, it is possible to prevent the above-described diffusion resistance of lithium ions from increasing, and the battery capacity efficiency may be improved. Further, as described above, in the present invention, the first negative electrode active material particles including a carbon coating layer containing specific hard carbon and having a relatively high hardness and the second negative electrode active material particles having a relatively low hardness are mixed, and thus rolling performance is remarkably improved, and a change in the specific surface area during rolling is minimized, so that high temperature-storage performance may be improved to a superior level.

The first negative electrode active material particles and the second negative electrode active material particles may be included at a weight ratio of 60:40 to 90:10, preferably 65:35 to 80:20, and more preferably 70:30 to 75:25 in the negative electrode active material for the lithium secondary battery. When the first and second negative electrode active material particles are contained at the weight ratio described above, the change in the specific surface area of the active material during rolling is further reduced, so that the high-temperature storage performance can be improved and the effect of reducing the charge transfer resistance of lithium ions can be further enhanced.

Method of Preparing Negative Electrode Active Material for Lithium Secondary Battery Further, the present invention provides a method of preparing a negative electrode active material for a lithium secondary battery. The preparation method may be a method of preparing a negative electrode active material for a lithium secondary battery.

Specifically, the method of preparing a negative electrode active material for a lithium secondary battery of the present invention includes steps of preparing first negative electrode active material particles and second negative electrode active material particles; and mixing the first negative electrode active material particles and the second negative electrode active material particles. The step of preparing first negative electrode active material particles includes: step a), preparing first artificial graphite particles; and step b), mixing the first artificial graphite particles and a carbon coating layer-forming material including a carbon-based material formed by a first heat treatment and a polymer for controlling crystallinity, and performing a second heat treatment on the mixture to form a carbon coating layer including hard carbon on the first artificial graphite particles. A difference between an average particle diameter $D_{50}$ of the first negative electrode active material particles and an average particle diameter $D_{50}$ of the second negative electrode active material particles is 5 µm or less, and a temperature at an exothermic peak in differential thermogravimetric analysis of the carbon coating layer is in a range of 580 to 690° C.

The method of preparing a negative electrode active material for a lithium secondary battery of the present invention includes steps of preparing first negative electrode active material particles and second negative electrode active material particles; and mixing the first negative electrode active material particles and the second negative electrode active material particles.

The step of preparing first negative electrode active material particles includes: step a), preparing first artificial graphite particles; and step b), mixing the first artificial graphite particles and a carbon coating layer-forming material including a carbon-based material formed by a first heat treatment and a polymer for controlling crystallinity, and performing a second heat treatment on a mixture to form a carbon coating layer including hard carbon on the first artificial graphite particles.

A difference between an average particle diameter $D_{50}$ of the first negative electrode active material particles and an average particle diameter $D_{50}$ of the second negative electrode active material particles is 5 μm or less.

The method of preparing a negative electrode active material for a lithium secondary battery of the present invention controls the first negative electrode active material particles and the second negative electrode active material particles to have a difference in average particle diameter $D_{50}$ of 5 μm or less, thereby preventing the diffusion resistance of lithium ions from increasing and improving the battery capacity efficiency.

Further, in the method of preparing a negative electrode active material for a lithium secondary battery of the present invention, an exothermic peak in differential thermogravimetric analysis of the carbon coating layer is in the range of 580 to 690° C. Accordingly, the structural stability of the active material may be improved, thereby enhancing the high-temperature storage characteristics and lifetime characteristics. Further, it is possible to provide a suitable level of crystallinity to the first negative electrode active material particles to prevent the diffusion resistance of lithium ions from increasing excessively, thereby improving the rapid charging characteristics of the battery.

In the present invention, the description of the first artificial graphite particles, the carbon coating layer-forming material, the first negative electrode active material particles, the second negative electrode active material particles, differential thermogravimetric analysis and an exothermic peak is as described above.

The carbon coating layer-forming material may include a carbon-based material formed by the first heat treatment and a polymer for controlling crystallinity.

The carbon-based material may be formed by performing the first heat treatment on at least one selected from the group consisting of coke, petroleum pitch and coal pitch, and preferably, may be formed by performing the first heat treatment on petroleum pitch.

The first heat treatment may be performed at 830 to 1,220° C., and preferably, may be performed at 1,100 to 1,200° C. The carbon-based material formed by the first heat treatment in the temperature range described above may be formed of hard carbon having desired hardness and crystallinity at the time of forming the carbon coating layer. Accordingly, the exothermic peak range in the differential thermal analysis may be satisfied and the effect of improving the high-temperature storage characteristics, lifetime characteristics, and rapid charging characteristics may be maximized.

The polymer for controlling crystallinity is a material which is subjected to the second heat treatment together with the carbon-based material to form hard carbon. The polymer for controlling crystallinity is subjected to the second heat treatment together with the carbon-based material to satisfy the exothermic peak range in the differential thermogravimetric analysis, to form a uniform and stable carbon coating layer and hard carbon with desired levels of hardness and crystallinity. When the carbon coating layer is formed only of the carbon-based material without the use of the polymer for controlling crystallinity, the crystallinity of the carbon coating layer becomes excessively high, so that it may be difficult to achieve a desired level of an exothermic peak range in differential thermogravimetric analysis, lifetime characteristics, and rapid charging characteristics.

The polymer for controlling crystallinity may be one or more selected from the group consisting of polyacrylic acid, polyacrylonitrile, and polyimide, and preferably, polyacrylic acid.

The carbon coating layer-forming material may include the carbon-based material and the polymer for controlling crystallinity at a weight ratio of 20:80 to 80:20, preferably, 40:60 to 60:40. Within the above-described range, a desired level of hardness and crystallinity may be secured, and thus the structural stability of the active material may be improved, and the entry and exit of lithium ions may be facilitated to further enhance rapid charging characteristics.

The second heat treatment on the first artificial graphite particles and the carbon coating layer-forming material may be performed by further adding a carbon coating layer-forming binder in addition to the above-described components. The carbon coating layer-forming binder may serve to further facilitate the formation of the carbon coating layer by improving the cohesion or adhesion between the artificial graphite particles and the carbon coating layer-forming material.

The carbon coating layer-forming binder may be one or a mixture of two or more selected from the group consisting of a vinylidene fluoride-hexafluoropropylene copolymer, polyvinylidene fluoride, polyacrylonitrile, polymethyl methacrylate, polyvinyl alcohol, carboxymethyl cellulose, starch, hydroxypropyl cellulose, regenerated cellulose, polyvinylpyrrolidone, polytetrafluoroethylene, polyethylene, polypropylene, polyacrylic acid, an ethylene propylene diene monomer (EPDM), a sulfonated-EPDM, styrene butadiene rubber and fluorocarbon rubber, and preferably, a vinylidene fluoride-hexafluoropropylene copolymer, polyvinylidene fluoride, or a mixture thereof.

The second heat treatment may be performed at a temperature of 1,000 to 3,000° C., preferably 1,200 to 2,500° C. in view of smooth formation of the carbon coating layer by the carbon coating layer-forming material.

Negative Electrode for Lithium Secondary Battery

Further, the present invention provides a negative electrode for a lithium secondary battery including the above-described negative electrode active material for a lithium secondary battery.

Specifically, the negative electrode for a lithium secondary battery of the present invention includes: a negative electrode current collector; and a negative electrode composite material layer formed on the negative electrode current collector. The negative electrode composite material layer includes the above-described negative electrode active material for a lithium secondary battery.

The negative electrode current collector generally has a thickness of 3 to 500 μm. The negative electrode current collector is not particularly limited as long as it has high conductivity without causing chemical changes in the battery. For example, copper, stainless steel, aluminum, nickel, titanium, calcined carbon, copper or stainless steel which is surface-treated with carbon, nickel, titanium, silver or the like, an aluminum-cadmium alloy, or the like may be used. Further, like the positive electrode current collector, fine irregularities may be formed on the current collector surface to enhance the binding force of the negative electrode active material. For example, the negative electrode current collector may be used in various forms such as a film, a sheet, a foil, a net, a porous body, a foam, a nonwoven fabric, etc.

The negative electrode composite material layer includes the above-described negative electrode active material for a lithium secondary battery.

The description of the first negative electrode active material particles and the second negative electrode active material particles included in the negative electrode active material for a lithium secondary battery of the present invention is as described above.

The negative electrode composite material layer may contain, in addition to the above-described negative electrode active material for a lithium secondary battery, other active materials known in the related field within the range not hindering the effect of the present invention, specifically, one or two or more of negative electrode active materials selected from the group consisting of carbonaceous materials; a lithium-containing titanium composite oxide (LTO), metals such as Si, Sn, Li, Zn, Mg, Cd, Ce, Ni or Fe; an alloy including the metals; oxides of the metals; and a composite of the metals and carbon.

The negative electrode active material may be included at 80 to 99 wt % based on the total weight of the negative electrode composite material.

Further, the negative electrode material composite layer of the present invention may optionally further include at least one additive selected from the group consisting of a binder, a thickener, and a conductive material.

The binder is a component which assists to enhance the bonding between the conductive material, the active material, and the current collector, and may be generally included at 1 to 30 wt % based on the total weight of the negative electrode composite material. Examples of the binder include polyvinylidene fluoride (PVDF), polyvinyl alcohol, carboxymethylcellulose (CMC), starch, hydroxypropylcellulose, regenerated cellulose, polyvinyl pyrrolidone, polytetrafluoroethylene, polyethylene, polypropylene, an ethylene propylene diene polymer (EPDM), a sulfonated EPDM, styrene butadiene rubber (SBR), a fluororubber, various copolymers thereof and the like.

As the thickener, any thickener conventionally used in a lithium secondary battery may be used, and examples thereof include carboxymethyl cellulose (CMC) and the like.

The conductive agent is a component for further improving the conductivity of the negative electrode active material, and may be added in an amount of 1 to 20 wt % based on the total weight of the negative electrode composite material. Any conductive agent may be used without particular limitation so long as it has suitable conductivity without causing chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial available conductive agent include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include water or an organic solvent, such as N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in the range of 50 to 95 wt %, preferably, 70 to 90 wt %.

Lithium Secondary Battery

Further, the present invention provides a lithium secondary battery including the above-described negative electrode for a lithium secondary battery.

The lithium secondary battery may include the above-described negative electrode for a lithium secondary battery, a positive electrode, a separator interposed between the negative electrode and the positive electrode, and an electrolyte.

Specifically, the lithium secondary battery of the present invention may be prepared by injecting a non-aqueous electrolyte solution into an electrode assembly including a positive electrode, a negative electrode, and a separator disposed between the positive electrode and the negative electrode. Here, those typically used in the production of the lithium secondary battery may all be used as the positive electrode, the negative electrode, and the separator forming the electrode assembly.

Here, the positive electrode may be prepared by coating a positive electrode current collector with a positive electrode active material slurry selectively including a binder, a conductive agent, and a solvent as well as a positive electrode active material, and drying and rolling the coated positive electrode current collector.

The positive electrode current collector is not particularly limited so long as it has conductivity without causing adverse chemical changes in the battery, and, for example, stainless steel, aluminum, nickel, titanium, calcined carbon, or aluminum or stainless steel that is surface-treated with one of carbon, nickel, titanium, silver, or the like may be used.

The positive electrode active material is a compound capable of reversibly intercalating and deintercalating lithium, and may specifically include a lithium composite metal oxide including lithium and at least one metal such as cobalt, manganese, nickel, or aluminum. Specifically, the lithium composite metal oxide may include a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), a lithium-nickel-cobalt-based oxide (e.g., $LiNi_{1-Y1}Co_{Y1}O_2$ (where $0<Y1<1$), a lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}CO_{q1}Mn_{r2})O_4$ (where $0<p1<2$, $0<q1<2$, $0<r2<2$, and $p1+q1+r2=2$), etc.), or a lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and S2 are atomic fractions of each independent element, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, a lithium nickel manganese cobalt oxide (e.g., $Li(Ni_{0.6}Mn_{0.2}Co_{0.2})O_2$, $Li(N_{0.5}Mn_{0.3}Co_{0.2})O_2$, or $Li(Ni_{0.8}Mn_{0.1}Co_{0.1})O_2$), or a lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 to 99 wt % based on the total weight of respective positive electrode composite materials.

The binder is a component which assists in the bonding between the active material and the conductive material, and the binding to the current collectors and may be generally included at 1 to 30 wt % based on the total weight of the positive electrode composite material. Examples of the binder include polyvinylidene fluoride, polyvinyl alcohol, carboxymethyl cellulose (CMC), starch, hydroxypropylcellulose, regenerated cellulose, polyvinyl pyrrolidone, polytetrafluoroethylene, polyethylene, polypropylene, an ethylene propylene diene polymer (EPDM), a sulfonated EPDM, styrene butadiene rubber, a fluororubber, various copolymers thereof and the like.

The conductive material is usually added in an amount of 1 to 30 wt % based on the total weight of the positive electrode composite material.

As the conductive agent, any conductive agent may be used without particular limitation so long as it has suitable conductivity without causing chemical changes in the battery, and, for example, a conductive material such as: graphite; a carbon-based material such as carbon black, acetylene black, Ketjen black, channel black, furnace black, lamp black, thermal black or the like; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), Super P (Timcal Graphite & Carbon), etc.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, preferably, 70 wt % to 90 wt %.

In the lithium secondary battery, the separator separates the negative electrode and the positive electrode and provides a path for migration of lithium ions. The separator may be used without any particular limitation as long as it is commonly used as a separator in the secondary battery. In particular, a separator having low resistance against the ion movement of an electrolyte and excellent impregnability of an electrolyte is preferred. Specifically, porous polymer films such as porous polymer films formed of polyolefin-based polymers such as ethylene homopolymers, propylene homopolymers, ethylene/butene copolymers, ethylene/hexene copolymers, ethylene/methacrylate copolymers and the like or a laminated structure having two or more layers thereof may be used. Further, a conventional porous nonwoven fabric, for example, a nonwoven fabric formed of glass fiber with a high melting point, polyethylene terephthalate fiber or the like may be used. Further, a coated separator containing a ceramic component or a polymer for controlling crystallinity to secure heat resistance or mechanical strength may be used, and may be optionally used as a single layer or a multilayer structure.

Further, examples of the electrolyte used in the present invention include an organic liquid electrolyte, an inorganic liquid electrolyte, a solid polymer electrolyte, a gel-type polymer electrolyte, a solid inorganic electrolyte, a molten-type inorganic electrolyte and the like which are usable in the production of the lithium secondary battery, but are not limited thereto.

Specifically, the electrolyte may include an organic solvent and a lithium salt.

The organic solvent may be used without limitation as long as it may act as a medium which enables the movement of ions involved in the electrochemical reactions of a battery. Specifically, the organic solvent may be an ester-based solvent such as methyl acetate, ethyl acetate, γ-butyrolactone, ε-caprolactone and the like; an ether-based solvent such as dibutyl ether, tetrahydrofuran or the like; a ketone-based solvent such as cyclohexanone; an aromatic hydrocarbon-based solvent such as benzene, fluorobenzene and the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) and the like; an alcohol-based solvent such as ethyl alcohol, isopropyl alcohol and the like; nitriles such as R—CN (wherein R is a linear, branched or cyclic C2 to C20 hydrocarbon group and may include a double-bond, aromatic ring or an ether bond); amides such as dimethylformamide; dioxolanes such as 1,3-dioxolane; or sulfolanes, etc. Among them, a carbonate-based solvent is preferred, and a mixture of a cyclic carbonate having high ionic conductivity and a high dielectric constant, such as ethylene carbonate or propylene carbonate, which can increase the charge and discharge performance of the battery, and a linear carbonate-based compound with low viscosity (for example, ethyl methyl carbonate, dimethyl carbonate, diethyl carbonate, etc.) is more preferred. In this case, when the cyclic carbonate and the chain-type carbonate are mixed in a volume ratio of about 1:1 to 1:9, the performance of the electrolyte may be excellent.

The lithium salt may be used without particular limitation as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiCl$, $LiI$, or $LiB(C_2O_4)_2$, etc. The concentration of the lithium salt is preferably within the range of 0.1 M to 2.0 M. When the concentration of the lithium salt is within the above-described range, the electrolyte has suitable conductivity and viscosity, so that it may exhibit excellent electrolyte performance and the lithium ion may effectively move.

As described above, since the lithium secondary battery according to the present invention stably exhibits excellent discharge capacity, rapid charging characteristics, and capacity retention, the lithium secondary battery is suitable for portable devices, such as mobile phones, notebook computers, and digital cameras, and electric cars, such as hybrid electric vehicles (HEVs), and may be particularly suitable for a battery constituting a medium- and large-sized battery module. Accordingly, the present invention may also provide a medium- and large-sized battery module including the above-described secondary battery as a unit cell.

The medium- and large-sized battery module may be suitable for power sources requiring high output and high capacity, such as an electric vehicle, a hybrid electric vehicle, and a power storage device.

Hereinafter, the present invention will be described in detail with reference to examples so that those skilled in the art can readily carry out the invention. However, the present invention may be embodied in various different forms and is not limited to the examples described below.

EXAMPLE 1: PREPARATION OF NEGATIVE ELECTRODE ACTIVE MATERIAL FOR LITHIUM SECONDARY BATTERY

Preparation of First Negative Electrode Active Material Particles

A coking process in which petroleum pitch, which is a byproduct produced after oil extraction, was calcined at 1,500° C. was performed to form needle coke-based artificial graphite, and the needle coke-based artificial graphite was subjected to heat treatment at 3,000° C. for 1 hour or more to prepare graphitized primary artificial graphite particles having an average particle diameter of 10 μm.

Subsequently, the primary artificial graphite particles and a mixture in which petroleum pitch which passed through the first heat treatment at 1,150° C. as a carbon coating layer-forming material and polyacrylic acid as a polymer for controlling crystallinity were included at a weight ratio of 50:50 were mixed. Polyvinylidene fluoride (PVDF) as a carbon coating layer-forming binder was added to the resulting mixture. The primary artificial graphite particles, the carbon coating layer-forming material and the carbon coating layer-forming binder were mixed at a weight ratio of 7:2:1. The mixture was rotated at a speed of 3000 rpm at 1500° C. and subjected to a second heat treatment, aggregation, carbonization and graphitization to prepare secondary artificial graphite particles (first negative electrode active material particles) having an average particle diameter $D_{50}$ of 20 μm and having a hard carbon coating layer formed thereon.

In the first negative electrode active material particles thus prepared in Example 1, a temperature at an exothermic peak in differential thermogravimetric analysis of the carbon coating layer was 650° C.

Preparation of Second Negative Electrode Active Material Particles

A coking process in which petroleum pitch, which is a byproduct produced after oil extraction, was calcined at 1,500° C. was performed to form needle coke-based artificial graphite, and the needle coke-based artificial graphite was subjected to heat treatment at 3,000° C. for 1 hour or more to prepare graphitized primary artificial graphite particles having an average particle diameter of 10 μm.

Subsequently, the primary artificial graphite particles, pitch, and a binder (PVDF) at a weight ratio of 98:1:1 were introduced into a mixing reactor, and rotated at a speed of 3000 rpm at 1500° C. and aggregated to prepare secondary artificial graphite particles (second negative electrode active material particles) having an average particle diameter $D_{50}$ of 20 μm.

Preparation of Negative Electrode Active Material

Next, the first negative electrode active material particles and the second negative electrode active material particles were mixed at a weight ratio of 70:30 and mixed using a TK mixer to prepare a negative electrode active material of Example 1.

EXAMPLE 2: PREPARATION OF NEGATIVE ELECTRODE ACTIVE MATERIAL FOR LITHIUM SECONDARY BATTERY

First negative electrode active material particles having an average particle diameter $D_{50}$ of 20 μm were prepared in the same manner as in Example 1 except that a mixture including petroleum pitch which passed through the first heat treatment at 900° C. as a carbon coating layer-forming material and polyacrylic acid as a polymer for controlling crystallinity at a weight ratio of 50:50 was used.

Next, the first negative electrode active material particles and the second negative electrode active material particles prepared in Example 1 were mixed at a weight ratio of 70:30 and mixed using a TK mixer to prepare a negative electrode active material of Example 2.

In the first negative electrode active material particles thus prepared in Example 2, a temperature at an exothermic peak in differential thermogravimetric analysis of the carbon coating layer was 600° C.

EXAMPLE 3: PREPARATION OF NEGATIVE ELECTRODE ACTIVE MATERIAL FOR LITHIUM SECONDARY BATTERY

A negative electrode active material for a lithium secondary battery was prepared in the same manner as in Example 1 except that the first negative electrode active material particles and the second negative electrode active material particles prepared in Example 1 were mixed at a weight ratio of 55:45.

EXAMPLE 4: PREPARATION OF NEGATIVE ELECTRODE ACTIVE MATERIAL FOR LITHIUM SECONDARY BATTERY

A negative electrode active material for a lithium secondary battery was prepared in the same manner as in Example 1 except that the first negative electrode active material particles and the second negative electrode active material particles prepared in Example 1 were mixed at a weight ratio of 95:5.

Comparative Example 1: Preparation of Negative Electrode Active Material for Lithium Secondary Battery A negative electrode active material of Comparative Example 1 was prepared only using the first negative electrode active material particles prepared in Example 1.

Comparative Example 2: Preparation of Negative Electrode Active Material for Lithium Secondary Battery First negative electrode active material particles having an average particle diameter $D_{50}$ of 20 μm were prepared in the same manner as in Example 1 except that a mixture including petroleum pitch which passed through the first heat treatment at 750° C. as a carbon coating layer-forming material and polyacrylic acid as a polymer for controlling crystallinity at a weight ratio of 50:50 was used.

Next, the first negative electrode active material particles and the second negative electrode active material particles prepared in Example 1 were mixed at a weight ratio of 70:30 and mixed using a TK mixer to prepare a negative electrode active material of Comparative Example 2.

In the first negative electrode active material particles thus prepared in Comparative Example 2, a temperature at an exothermic peak in differential thermogravimetric analysis of the carbon coating layer was 550° C.

Comparative Example 3: Preparation of Negative Electrode Active Material for Lithium Secondary Battery A coking process in which petroleum pitch, which is a byproduct produced after oil extraction, was calcined at 1,500° C. was performed to form needle coke-based artificial graphite, and the needle coke-based artificial graphite was subjected to heat treatment at 3,000° C. for 1 hour or more to prepare graphitized primary artificial graphite particles having an average particle diameter of 10 μm.

Subsequently, the primary artificial graphite particles, pitch, and a binder (PVDF) at a weight ratio of 98:1:1 were introduced into a mixing reactor, and rotated at a speed of 3000 rpm at 1500° C. and aggregated to prepare secondary artificial graphite particles.

Thereafter, the secondary artificial graphite particles prepared above and petroleum pitch which was heat-treated at 1,300° C. were mixed at a weight ratio of 95:5, and the mixture was heat-treated at 1,500° C. to form a carbon coating layer. In the formation of the carbon coating layer, only petroleum pitch was used as a carbon coating layer-forming material, and a polymer for controlling crystallinity was not used unlike Example 1. Finally, first negative electrode active material particles having an average particle diameter $D_{50}$ of 20 μm were prepared.

Next, the first negative electrode active material particles and the second negative electrode active material particles prepared in Example 1 were mixed at a weight ratio of 70:30 and mixed using a TK mixer to prepare a negative electrode active material of Comparative Example 3.

In the first negative electrode active material particles thus prepared in Comparative Example 3, a temperature at an exothermic peak in differential thermogravimetric analysis of the carbon coating layer was 750° C.

Comparative Example 4: Preparation of Negative Electrode Active Material for Lithium Secondary Battery A negative electrode active material for a lithium secondary battery was prepared in the same manner as in Example 1 except that artificial graphite particles having an average particle diameter $D_{50}$ of 8 μm was used instead of the second negative electrode active material particles prepared in Example 1.

Comparative Example 5: Preparation of Negative Electrode Active Material for Lithium Secondary Battery A negative electrode active material for a lithium secondary battery was prepared in the same manner as in Example 1 except that artificial graphite particles having an average particle diameter $D_{50}$ of 35 μm was used instead of the second negative electrode active material particles prepared in Example 1.

TABLE 1

| Classification | | Examples | | | | Comparative Examples | | | | |
| --- | --- | --- | --- | --- | --- | --- | --- | --- | --- | --- |
| | | 1 | 2 | 3 | 4 | 1 | 2 | 3 | 4 | 5 |
| First negative electrode active material particles | Temperature at exothermic peak in differential thermogravimetric analysis of carbon coating layer (° C.) | 650 | 600 | 650 | 650 | 650 | 550 | 750 | 650 | 650 |
| | Average particle diameter ($D_{50}$, μm) | 20 | 20 | 20 | 20 | 20 | 20 | 20 | 20 | 20 |
| | Wt % | 70 | 70 | 55 | 95 | 100 | 70 | 70 | 70 | 70 |
| Second negative electrode active material particles | Average particle diameter ($D_{50}$, μm) | 20 | 20 | 20 | 20 | — | 20 | 20 | 8 | 35 |
| | Wt % | 30 | 30 | 45 | 5 | — | 30 | 30 | 30 | 30 |

EXPERIMENTAL EXAMPLES

Production of Negative Electrode for Lithium Secondary Battery

The negative electrode active materials prepared in the Examples and Comparative Examples, Super C65 as a conductive material, styrene butadiene rubber (SBR) as a binder and carboxymethyl cellulose (CMC) as a thickener were mixed at a weight ratio of 95.9:1:1.9:1.2, and water was added thereto to prepare a negative electrode slurry.

Subsequently, a copper foil was coated with the negative electrode slurry with a thickness of 65 μm, vacuum dried at about 130° C. for 8 hours and rolled to prepare a negative electrode. Here, the loading of the negative electrode was 3.61 mAh/cm$^2$.

Production of Lithium Secondary Battery $LiNi_{0.6}Co_{0.2}Mn_{0.2}O_2$ as a positive electrode active material, Li-435 (produced by Asahi Denka Co., Ltd.) as a conductive material, a mixture including KF9700 (produced by Kureha Corporation) and BM-730H (produced by Zeon Corporation) at a weight ratio of 90:10 as a binder, and Daicel 2200 (produced by Daicel Corporation) as a thickener were mixed at a weight ratio of 96.25:1.0:1.5:1.25, and water was added thereto to prepare a positive electrode slurry. Subsequently, an aluminum foil was coated with the positive electrode slurry with a thickness of 12 μm, vacuum dried at about 130° C. for 8 hours and rolled to prepare a positive electrode. Here, the loading of the positive electrode was 3.25 mAh/cm².

A polyolefin separator was interposed between the negative electrode and the positive electrode, and a non-aqueous electrolyte solution in which 0.7M-LiPF$_6$ and 0.3M LIFSI were dissolved in a non-aqueous electrolyte solvent in which ethylene carbonate (EC) and ethyl methyl carbonate (EMC) were mixed at a volume ratio of 3:7 was injected to prepare a monocell type full cell secondary battery.

1. Evaluation of High-Temperature Storage Characteristics

In the secondary batteries of the Examples and Comparative Examples, the battery was charged up to an SOC of 100 and stored at a high temperature (60° C.) for 4 weeks. The resulting remaining capacity (mAh) and capacity retention rate (%) are shown in the following Table 2.

TABLE 2

| Classification | Examples | | | | Comparative Examples | | | | |
|---|---|---|---|---|---|---|---|---|---|
| | 1 | 2 | 3 | 4 | 1 | 2 | 3 | 4 | 5 |
| Remaining capacity (mAh) | 34.0 | 32.2 | 31.1 | 30.5 | 28.3 | 28.1 | 24.5 | 22.8 | 21.7 |
| Capacity retention rate (%) | 85.0 | 80.5 | 77.8 | 76.3 | 70.8 | 70.3 | 61.3 | 57.0 | 54.3 |

2. Evaluation of Rapid Charging Characteristics

Li-plating experiments were performed on the negative electrodes for the lithium secondary battery of the Examples and Comparative Examples produced in the Experimental Example.

First, the negative electrode for a lithium secondary battery manufactured as described above was punched into a coin cell size, a polyolefin separator was interposed between a lithium metal foil as a counter electrode and the coin cell-sized negative electrode, and then an electrolyte solution in which 1M LiPF$_6$ was dissolved in a solvent in which ethylene carbonate (EC) and ethyl methyl carbonate (EMC) were mixed at a volume ratio of 50:50 was injected to produce coin-type half cells of the Examples and the Comparative Examples.

Thereafter, the coin-type half cells of the Examples and the Comparative Examples were charged and discharged at 1 C for 3 cycles, followed by charging at 3 C for 15 minutes to determine the inflection point of the first derivative, dQ/dV, of profile, and the Li-plating SOC (%), which is the SOC at the time when lithium deposition occurred on the surface of the negative electrode, was quantified. The results are shown in Table 3.

TABLE 3

| Classification | Examples | | | | Comparative Examples | | | | |
|---|---|---|---|---|---|---|---|---|---|
| | 1 | 2 | 3 | 4 | 1 | 2 | 3 | 4 | 5 |
| Li-plating SOC (%) | 43 | 42 | 40 | 38 | 28 | 26 | 20 | 24 | 21 |

3. Evaluation of Rolling Performance

In the production of the negative electrode for lithium secondary batteries of the Examples and the Comparative Examples, the density (g/cc) of the negative electrode during the rolling process was calculated to evaluate the rolling performance of the negative electrode.

Specifically, a roll pressing machine equipped with an upper roll and a lower roll was used. Here, the roll was a straight roller, which is a non-heating roll having a strength of 0.4 S or less and a hardness of HrC60. The pressing speed in the rolling process was 0.3 to 2 m/s.

In the rolling process, the gap between the two upper and lower rolls was set to be 0% of a thickness of the target final negative electrode, and the density of the negative electrodes of the Examples and the Comparative Examples was measured. The results are shown in the following Table 4.

TABLE 4

| Classification | Examples | | | | Comparative Examples | | | | |
|---|---|---|---|---|---|---|---|---|---|
| | 1 | 2 | 3 | 4 | 1 | 2 | 3 | 4 | 5 |
| Density (g/cc) (Gap 0%) | 1.60 | 1.58 | 1.45 | 1.40 | 1.32 | 1.27 | 1.24 | 1.20 | 1.18 |

4. Evaluation of Capacity Efficiency

The batteries of the Examples and the Comparative Examples were charged and discharged to evaluate the discharge capacity and initial efficiency, which are shown in the following Table 5. The discharge capacity (mAh/g) and initial efficiency (%) were derived from the results of a first charge/discharge cycle according to the following charging and discharging conditions. Specifically, the initial efficiency (%) was derived by the following calculation.

Initial efficiency (%)=(Discharge capacity after first discharge/first charge capacity)×100

Charging conditions: constant current (CC)/constant voltage (CV) (5 mV/0.005 C current cut-off)

Discharging conditions: constant current (CC) condition 1.5V

TABLE 5

| Classification | Examples | | | | Comparative Examples | | | | |
|---|---|---|---|---|---|---|---|---|---|
| | 1 | 2 | 3 | 4 | 1 | 2 | 3 | 4 | 5 |
| Discharge capacity (mAh/g) | 353.0 | 353.0 | 353.1 | 353.2 | 352.8 | 352.1 | 352.3 | 350.2 | 351.1 |
| Initial efficiency (%) | 93.4 | 93.2 | 93.3 | 93.1 | 92.0 | 92.5 | 92.4 | 91.7 | 92.4 |

5. Evaluation of High-Temperature Cycle Characteristics

The batteries of the Examples and the Comparative Examples were charged and discharged at a high temperature (60° C.) at 1 C/1 C for 100 cycles, and the capacity retention rate (%) thus obtained was measured and shown in the following Table 6.

The capacity retention rate (%) was derived by the following calculation.

Capacity retention rate (%)=(discharge capacity after 100 cycles/discharge capacity of first cycle)× 100            (5)

TABLE 6

| Classifi-cation | Examples | | | | Comparative examples | | | | |
|---|---|---|---|---|---|---|---|---|---|
| | 1 | 2 | 3 | 4 | 1 | 2 | 3 | 4 | 5 |
| Capacity retention rate (%)@100 cycles | 93.2 | 92.7 | 92.1 | 91.9 | 84.3 | 82.8 | 81.7 | 79.0 | 78.8 |

Referring to Tables 2 to 6, it can be seen that the lithium secondary batteries produced using the negative electrode active materials of the Examples exhibit excellent high-temperature storage characteristics, excellent rapid charging characteristics, excellent rolling performance, excellent capacity efficiency, and excellent high-temperature cycle characteristics.

It can be seen that, in the case of Example 2 in which the exothermic peak in the differential thermal analysis is slightly deviated from the preferred range, and Examples 3 and 4 in which the weight ratio of the first negative electrode active material particles and the second negative electrode active material particles is slightly deviated from the preferred range, the effect described above is somewhat lower than that of Example 1.

In the case of Comparative Examples 2 and 3 in which the exothermic peak in the differential thermogravimetric analysis is slightly deviated from the preferred range of the present invention, the hardness and crystallinity of the carbon coating layer are not expressed at a desired level, and thus the results are unsatisfactory especially for high-temperature storage characteristics and rapid charging characteristics, and the rolling performance, capacity efficiency, and high-temperature cycle characteristics are also poor.

It can be seen that, in Comparative Examples 1, 4 and 5 in which only the first negative electrode active material particles were used or in which the difference in the average particle diameter $D_{50}$ between the first negative electrode active material particles and the second negative electrode active material particles exceeded 5 μm, the rolling performance is decreased, and thus the high-temperature storage characteristics and cycle characteristics are greatly reduced, and the rapid charge characteristics and capacity efficiency are reduced due to an increase in the diffusion resistance of lithium ions according to the movement path of lithium which became longer.

The invention claimed is:

1. A negative electrode active material for a lithium secondary battery, comprising:
   first negative electrode active material particles comprising first artificial graphite particles and a carbon coating layer on a surface of the first artificial graphite particles, wherein the carbon coating layer comprises hard carbon; and
   second negative electrode active material particles comprising second artificial graphite particles,
   wherein a difference between an average particle diameter $D_{50}$ of the first negative electrode active material particles and an average particle diameter $D_{50}$ of the second negative electrode active material particles is 5 μm or less, and
   a temperature at an exothermic peak in differential thermogravimetric analysis of the carbon coating layer is in a range of 580° C. to 690° C.

2. The negative electrode active material for a lithium secondary battery according to claim 1, wherein the average particle diameter $D_{50}$ of the first negative electrode active material particles and the second negative electrode active material particles is in a range of 15 μm to 27 μm.

3. The negative electrode active material for a lithium secondary battery according to claim 1, wherein a weight ratio of the first negative electrode active material particles to the second negative electrode active material particles is in a range of 60:40 to 90:10.

4. The negative electrode active material for a lithium secondary battery according to claim 1, wherein the first artificial graphite particles are secondary artificial graphite particles formed by aggregation of one or more primary artificial graphite particles.

5. A method of preparing a negative electrode active material for a lithium secondary battery, the method comprising steps of:
   preparing first negative electrode active material particles and second negative electrode active material particles; and
   mixing the first negative electrode active material particles and the second negative electrode active material particles together,
   wherein the step of preparing first negative electrode active material particles comprises:
   step a), preparing first artificial graphite particles; and
   step b), mixing the first artificial graphite particles and a carbon coating layer-forming material comprising a carbon-based material formed by a first heat treatment and a polymer for controlling crystallinity, and performing a second heat treatment on the mixture of the first artificial graphite particles and the carbon coating layer-forming material to form a carbon coating layer comprising hard carbon on a surface of the first artificial graphite particles,
   a difference between an average particle diameter $D_{50}$ of the first negative electrode active material particles and an average particle diameter $D_{50}$ of the second negative electrode active material particles is 5 μm or less,
   a temperature at an exothermic peak in differential thermogravimetric analysis of the carbon coating layer is in a range of 580° C. to 690° C.

6. The method according to claim 5, wherein the polymer for controlling crystallinity is one or more selected from the group consisting of polyacrylic acid, polyacrylonitrile, and polyimide.

7. The method according to claim 5, wherein the carbon-based material is formed by performing the first heat treatment on at least one selected from the group consisting of coke, petroleum pitch and coal pitch.

8. The method according to claim 5, wherein the first heat treatment is performed at 830° C. to 1,220° C.

9. The method according to claim 5, wherein the second heat treatment is performed at 1,000° C. to 3,000° C.

10. A negative electrode for a lithium secondary battery, comprising:
    a negative electrode current collector; and
    a negative electrode composite material layer on a surface of the negative electrode current collector, wherein the negative electrode composite material layer comprises the negative electrode active material for a lithium secondary battery according to claim 1.

11. A lithium secondary battery comprising the negative electrode for a lithium secondary battery according to claim 10.

\* \* \* \* \*